United States Patent
Chen et al.

(10) Patent No.: US 10,796,194 B2
(45) Date of Patent: Oct. 6, 2020

(54) MOTION-AWARE KEYPOINT SELECTION SYSTEM ADAPTABLE TO ITERATIVE CLOSEST POINT

(71) Applicants: NCKU Research and Development Foundation, Tainan (TW); Himax Technologies Limited, Tainan (TW)

(72) Inventors: Chun-Wei Chen, Tainan (TW); Wen-Yuan Hsiao, Tainan (TW); Ming-Der Shieh, Tainan (TW)

(73) Assignees: NCKU Research and Development Foundation, Tainan (TW); Himaz Technologies Limited, Tainan (TW)

( * ) Notice: Subject to any disclaimer, the term of this patent is extended or adjusted under 35 U.S.C. 154(b) by 99 days.

(21) Appl. No.: 16/255,357

(22) Filed: Jan. 23, 2019

(65) Prior Publication Data
US 2020/0234074 A1 Jul. 23, 2020

(51) Int. Cl.
| | |
|---|---|
| *G06K 9/46* | (2006.01) |
| *G06K 9/32* | (2006.01) |
| *G06T 7/90* | (2017.01) |
| *G06T 7/215* | (2017.01) |
| *G06T 7/579* | (2017.01) |
| *G06T 7/13* | (2017.01) |

(52) U.S. Cl.
CPC ......... *G06K 9/4671* (2013.01); *G06K 9/3241* (2013.01); *G06T 7/13* (2017.01); *G06T 7/215* (2017.01); *G06T 7/579* (2017.01); *G06T 7/90* (2017.01)

(58) Field of Classification Search
CPC .............................. G06K 9/4671; G06T 7/215
See application file for complete search history.

(56) References Cited

U.S. PATENT DOCUMENTS

| | | | |
|---|---|---|---|
| 2014/0029808 A1* | 1/2014 | Lee | ...................... A61B 5/4872 382/110 |
| 2017/0076146 A1* | 3/2017 | Saripalle | .............. G06K 9/4642 |

* cited by examiner

*Primary Examiner* — Tuan H Nguyen
(74) *Attorney, Agent, or Firm* — Donald E. Stout; Stout, Uxa & Buyan, LLP

(57) ABSTRACT

A motion-aware keypoint selection system adaptable to iterative closest point (ICP) includes a pruning unit that receives an image and selects at least one region of interest (ROI) composed of a selected subset of points on the image; a point quality estimation unit that receives the ROI and generates point quality; and a suppression unit that receives the point quality and generates keypoints. In one embodiment, a near edge region (NER) is selected as the ROI. In another embodiment, the point quality estimation unit generates point quality according to point motion and point depth.

16 Claims, 6 Drawing Sheets

MOTION-AWARE KEYPOINT SELECTION SYSTEM ADAPTABLE TO ITERATIVE CLOSEST POINT

BACKGROUND OF THE INVENTION

1. Field of the Invention

The present invention generally relates to iterative closest point (ICP), and more particularly to a motion-aware keypoint selection system adaptable to ICP.

2. Description of Related Art

Iterative closest point (ICP) is a technique adapted to minimizing difference between two clouds of points. Specifically, a target (or reference) cloud is kept fixed, while a source cloud is transformed to best match the target cloud.

ICP may be applied to visual odometry for determining the position and orientation of a robot in a wide variety of robotic applications. Specifically, ICP is commonly used to reconstruct two-dimensional (2D) or three-dimensional (3D) surfaces or to localize robots and achieve optimal path planning. ICP iteratively revises the transformation (e.g., translation and rotation) needed to minimize an error metric, such as a distance between the coordinates of the matched pairs from the source cloud to the target cloud.

Keypoint detection is often the first step for ICP applications such as simultaneous localization and mapping (SLAM) that constructs or updates a map of an unknown environment while simultaneously keeping track of an agent's location within it or visual tracking, robustness and accuracy of which are potentially affected by the keypoint detection.

Conventional keypoint detectors suffer from high computation complexity by using all points for ICP algorithm. Further, ICP performance is poorly degraded due to non-ideal feature pair. Therefore, a need has arisen to propose a novel keypoint selection technique to overcome drawbacks of the conventional keypoint detectors.

SUMMARY OF THE INVENTION

In view of the foregoing, it is an object of the embodiment of the present invention to provide a motion-aware keypoint selection system adaptable to iterative closest point (ICP) with reduced computation complexity and enhanced accuracy for ICP.

According to one embodiment, a motion-aware keypoint selection system adaptable to iterative closest point (ICP) includes a pruning unit, a point quality estimation unit and a suppression unit. The pruning unit receives an image and selects at least one region of interest (ROI) composed of a selected subset of points on the image. The point quality estimation unit receives the ROI and generates point quality. The suppression unit receives the point quality and generates keypoints. A near edge region (NER) is selected as the ROI. In another embodiment, the point quality estimation unit generates point quality according to point motion and point depth.

DETAILED DESCRIPTION OF THE INVENTION

Figure 1:
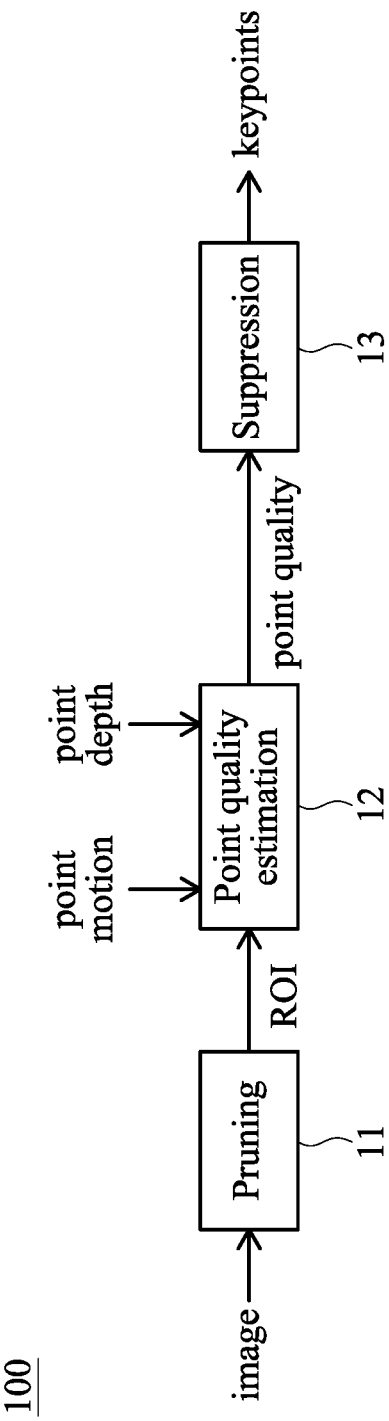
FIG. 1 shows a block diagram illustrating a motion-aware keypoint selection system adaptable to iterative closest point (ICP) according to one embodiment of the present invention.

FIG. 1 shows a block diagram illustrating a motion-aware keypoint selection system ("keypoint selection system" hereinafter) 100 adaptable to iterative closest point (ICP) according to one embodiment of the present invention. The blocks of the keypoint detection system 100 may be implemented by software, hardware or their combination, and may be performed, for example, by a digital image processor.

In one exemplary embodiment, the keypoint detection system 100 may be adapted to an augmented reality (AR) device. Hardware components for the AR device may primarily include a processor (e.g., an image processor), a display (e.g., head-mounted display) and sensors (e.g., a color-depth camera such as RGB-D camera for red, green, blue plus depth). Specifically, the sensors or camera captures scenes to generate image frames, which are then fed to the processor that performs the operations of the keypoint detection system 100. Augmented reality is then rendered in the display In the embodiment, the keypoint selection system 100 may include a pruning unit 11 coupled to receive an image, and configured to select at least one region of interest (ROI) composed of a selected subset of points (or pixels) on the image. Points other than the points in the ROI are discarded to simplify further processing of the keypoint selection system 100 and substantially decrease computation complexity without significantly reducing accuracy. Each point of the image may, for example, include color (e.g., red, green and blue) and depth. It is noted that the operation of the pruning unit 11 of the embodiment is point-based.

Figure 2A:
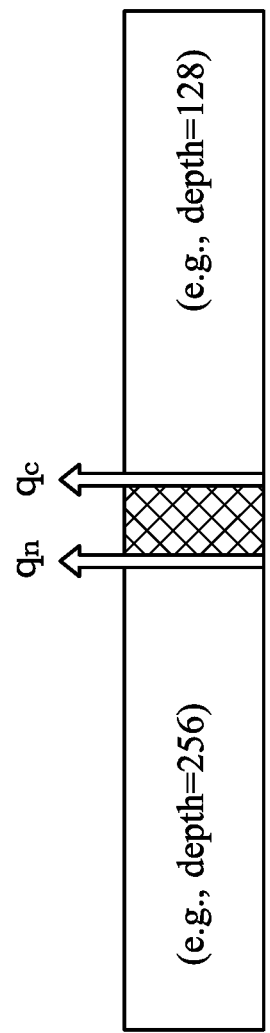
FIG. 2A shows an exemplary depth image of one line.
Figure 2B:
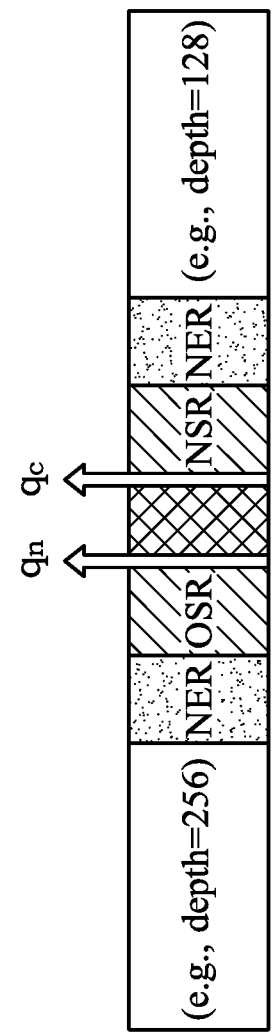
FIG. 2B shows a depth image, on which a near edge region (NER), an occluded skipping region (OSR) and a noise skipping region (NSR) have been determined by the pruning unit of FIG. 1 according to the embodiment of the present invention.

According to one aspect of the embodiment, a criterion for the pruning unit 11 is that near edge regions are selected as the ROI. FIG. 2A shows an exemplary depth image of one line, where $q_n$ represents a last valid (or background) pixel (or occluded edge), and $q_c$ represents a current valid (or foreground) pixel (or occluding edge). FIG. 2B shows a depth image, on which a near edge region (NER) (i.e., ROI), an occluded skipping region (OSR) and a noise skipping region (NSR) have been determined by the pruning unit 11 of FIG. 1 according to the embodiment of the present invention. The OSR abuts on the left of the last valid pixel $q_n$, and the NSR abuts on the right of the current valid pixel $q_c$. Specifically, as the NSR, commonly composed of a plurality of (e.g., 12) pixels, corresponds to boundaries or corners and their normal are difficult to be estimated, the NSR is thus discarded in the embodiment. As the OSR, commonly composed of a plurality of (e.g., 2) pixels, corresponds to occluded regions which do not have correct correspondence (in a target frame), the OSR is thus discarded in the embodiment. The NER (commonly composed of a plurality of pixels) to the left of the OSR and the NER to the right of the NSR are selected as the ROI because it contains useful information. In one embodiment, the pixel width of the OSR, the NSR and the NER may be predetermined.

The keypoint selection system 100 of the embodiment may include a point quality estimation unit 12 coupled to receive the ROI, and configured to generate point quality according to point motion and point depth, thus resulting in a motion-aware keypoint selection system 100. It is noted that the operation of the point quality estimation unit 12 of the embodiment is point-based.

In one embodiment, a saliency function of the point quality estimation unit 12 adopts a noise model as disclosed in "Modeling Kinect Sensor Noise for Improved 3D Reconstruction and Tracking," entitled to C. V. Nguyen et al., published in 2012 Second International Conference on 3D Imaging, Modeling, Processing, Visualization & Transmission, the disclosure of which is incorporated herein by reference.

Figure 3:
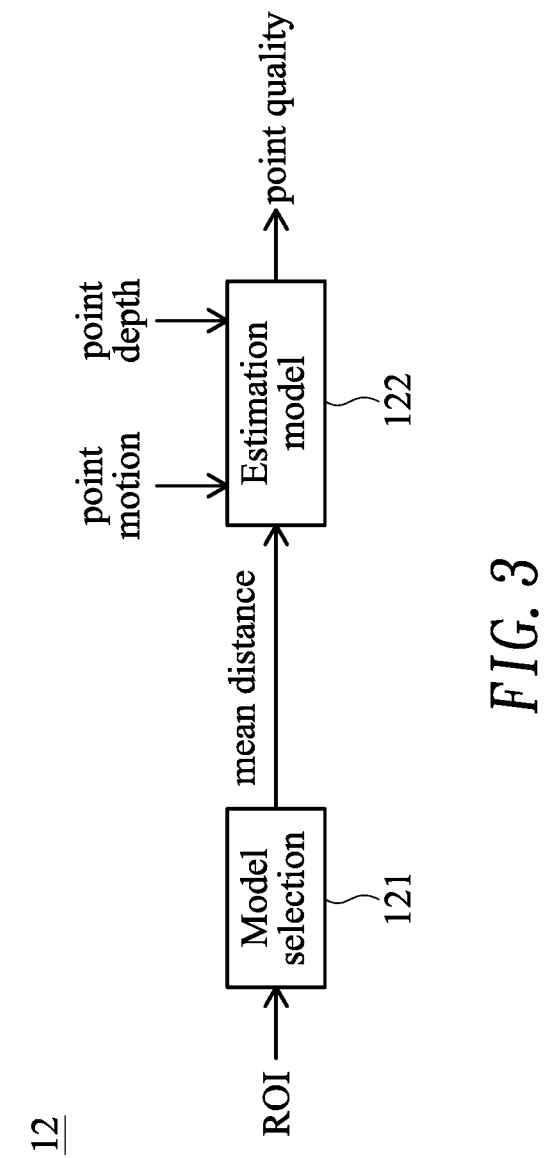
FIG. 3 shows a detailed block diagram of the point quality estimation unit of FIG. 1.
Figure 4A:
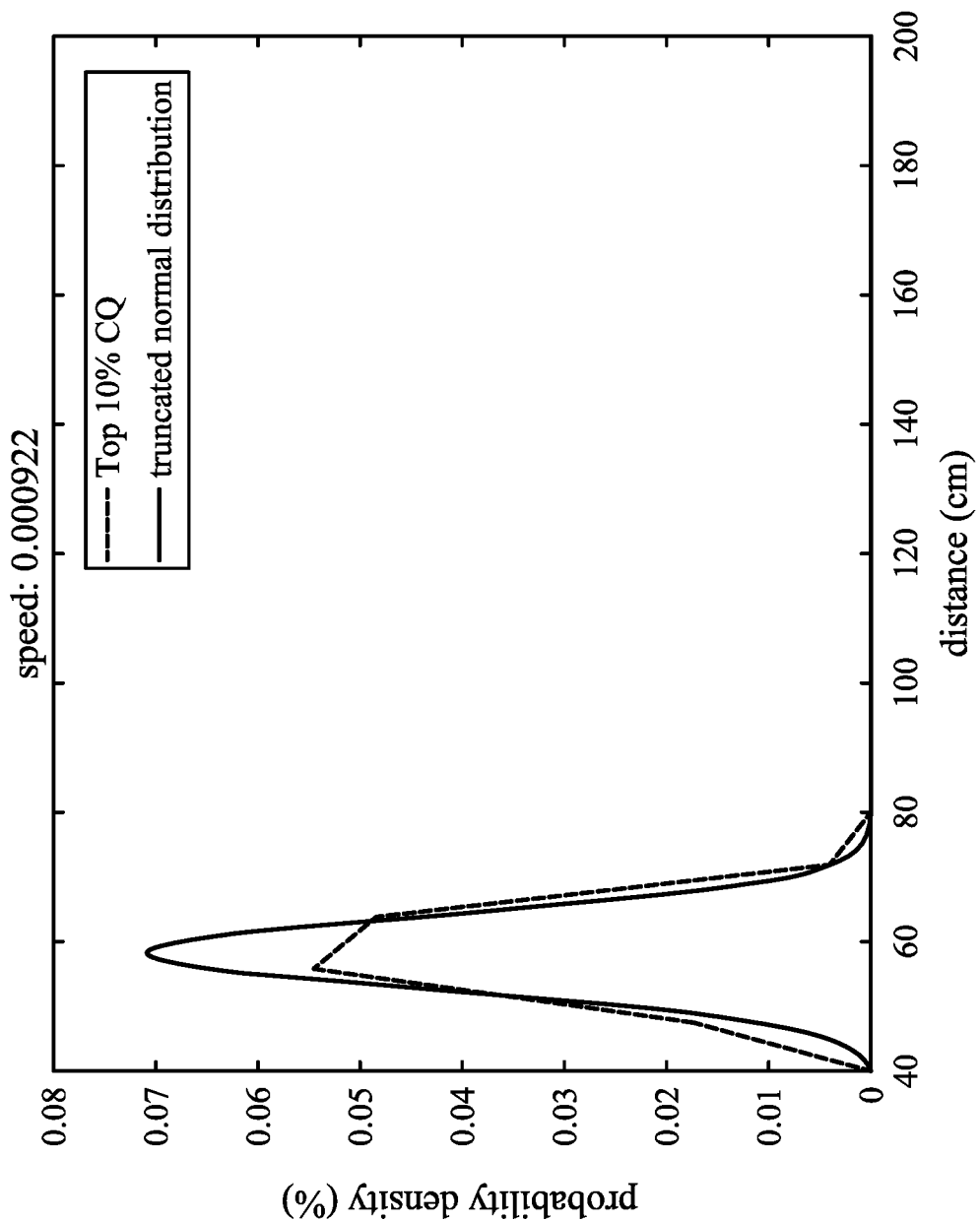
FIG. 4A to FIG. 4C show exemplary mean distances associated with different point motions.
Figure 4B:
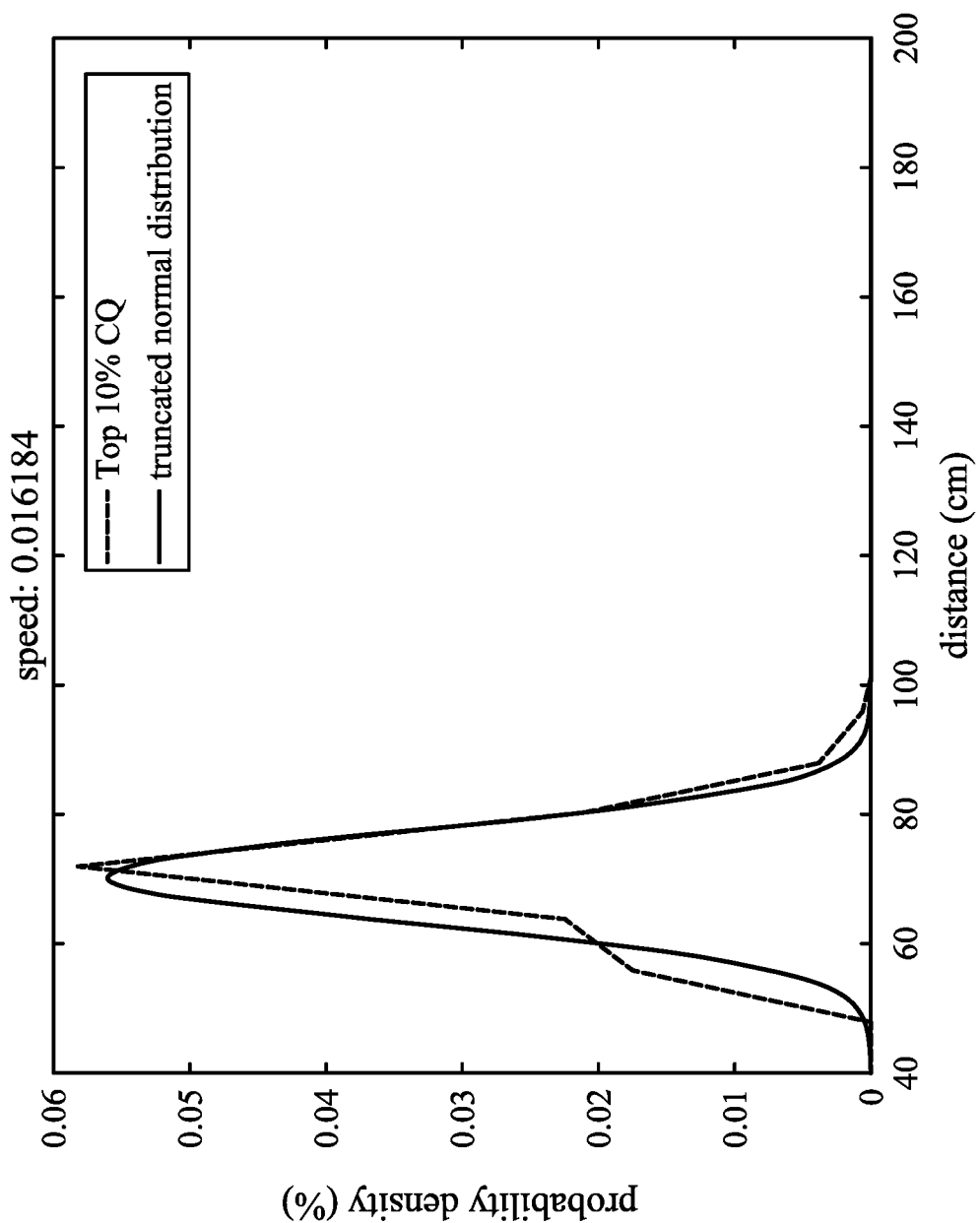
Figure 4C:
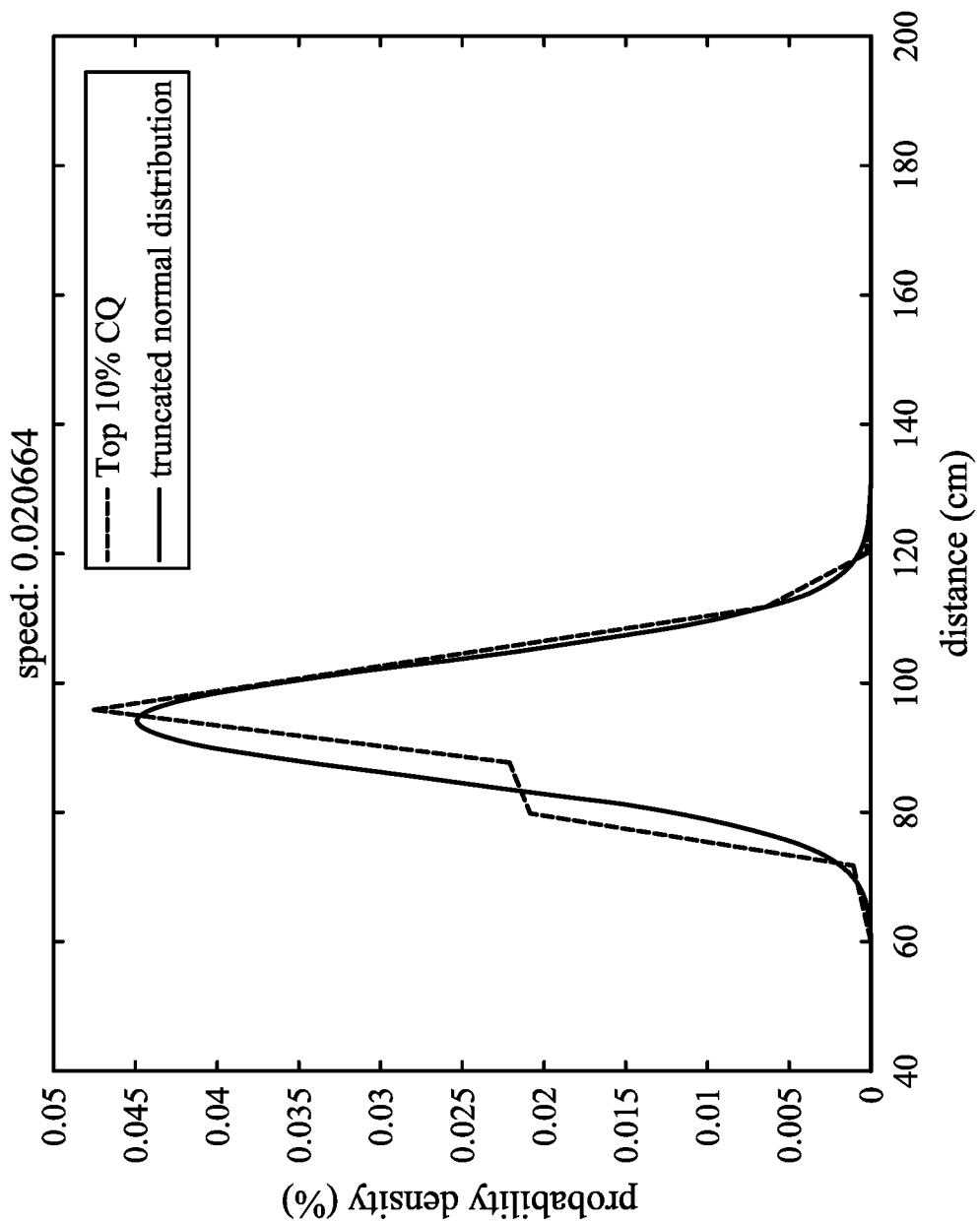

FIG. 3 shows a detailed block diagram of the point quality estimation unit 12 of FIG. 1. Specifically, the point quality estimation unit 12 may include a model selection unit 121 configured to generate a plurality of mean distances associated with different point motions for an image pair. In the embodiment, the point motion may represent camera movement. The larger the point motion is (i.e., faster motion), the larger the mean distance for the image pair is. To the contrary, the smaller the point motion is (i.e., slower motion), the smaller the mean distance for the image pair is. FIG. 4A to FIG. 4C show exemplary mean distances associated with different point motions.

Specifically, an image pair is subjected to ICP matching and correspondence quality (CQ) is measured (or determined) according to resultant correspondences of the ICP matching. In the embodiment, high-quality (e.g., top 10%) points are selected according to a result of the CQ measurement, and a mean distance is calculated for the image pair according to the selected points.

Referring back to FIG. 3, the point quality estimation unit 12 may include an estimation model unit 122 coupled to receive the mean distance (for the image pair) and the point depth according to the point motion, thereby generating the point quality.

Referring back to FIG. 1, the keypoint selection system 100 may include a suppression unit 13 coupled to receive the point quality, and configured to generate keypoints that are homogenously distributed and unclustered, thus speeding up computation since a lower number of keypoints is needed to cover the whole image. It is noted that the operation of the suppression unit 13 of the embodiment is frame-based.

Specifically, in one embodiment, the suppression unit 13 adopts non-maximal suppression (NMS) algorithm, details of which may be referred to "Multi-image matching using multi-scale oriented patches," entitled to M. Brown et al., published in 2005 IEEE Computer Society Conference on Computer Vision and Pattern Recognition, and "Efficient adaptive non-maximal suppression algorithms for homogeneous spatial keypoint distribution," entitled to O. Bailo et al., published in Pattern Recognition Letters, volume 106, April 2018, pages 53-60, the disclosures of which are incorporated herein by reference.

Although specific embodiments have been illustrated and described, it will be appreciated by those skilled in the art that various modifications may be made without departing from the scope of the present invention, which is intended to be limited solely by the appended claims.

What is claimed is:

1. A motion-aware keypoint selection system adaptable to iterative closest point (ICP), comprising:
a pruning unit that receives an image and selects at least one region of interest (ROI) composed of a selected subset of points on the image;
a point quality estimation unit that receives the ROI and generates point quality; and
a suppression unit that receives the point quality and generates keypoints;
wherein a near edge region (NER) is selected as the ROI;
wherein the point quality estimation unit comprises:
a model selection unit that generates a plurality of mean distances associated with different point motions for an image pair; and
an estimation model unit that receives the mean distance for the image pair and the point depth according to the point motion, thereby generating the point quality.

2. The system of claim 1, wherein the at least one ROI comprises two of said NER, one of which is to the left of an occluded skipping region (OSR), and the other of which is to the right of a noise skipping region (NSR), wherein the OSR abuts on the left of a last valid pixel, and the NSR abuts on the right of a current valid pixel.

3. The system of claim 1, wherein each point of the image comprises color and depth.

4. The system of claim 1, wherein operation of the pruning unit is point-based.

5. The system of claim 1, wherein operation of the point quality estimation unit is point-based.

6. The system of claim 1, wherein operation of the suppression unit is frame-based.

7. The system of claim 1, wherein the suppression unit adopts non-maximal suppression algorithm.

8. A motion-aware keypoint selection system adaptable to iterative closest point (ICP), comprising:
a pruning unit that receives an image and selects at least one region of interest (ROI) composed of a selected subset of points on the image;
a point quality estimation unit that receives the ROI and generates point quality according to point motion and point depth; and
a suppression unit that receives the point quality and generates keypoints;
wherein the point quality estimation unit comprises:
a model selection unit that generates a plurality of mean distances associated with different point motions for an image pair; and
an estimation model unit that receives the mean distance for the image pair and the point depth according to the point motion, thereby generating the point quality.

9. The system of claim 8, wherein the model selection unit performs the following steps:
subjecting the image pair to ICP matching;
measuring correspondence quality (CQ) according to resultant correspondences of the ICP matching;
selecting a plurality of points according to a result of the CQ measurement; and
calculating the mean distance for the image pair according to the selected points.

10. The system of claim 8, wherein the point motion represents camera movement.

11. The system of claim 8, wherein the larger the point motion is, the larger the mean distance for the image pair is.

12. The system of claim 8, wherein each point of the image comprises color and depth.

13. The system of claim 8, wherein operation of the pruning unit is point-based.

14. The system of claim 8, wherein operation of the point quality estimation unit is point-based.

15. The system of claim 8, wherein operation of the suppression unit is frame-based.

16. The system of claim 8, wherein the suppression unit adopts non-maximal suppression algorithm.

\* \* \* \* \*